United States Patent Office 3,221,014
Patented Nov. 30, 1965

3,221,014
MAGNESIUM DI (DICHLOROISOCYANURATE) AND PROCESSES FOR PREPARING SAME
William F. Symes, Webster Groves, Mo., assignor to Monsanto Company, a corporation of Delaware
No Drawing. Filed Dec. 30, 1960, Ser. No. 79,485
4 Claims. (Cl. 260—248)

The present invention relates to magnesium di (dichloroisocyanurate) and hydrates thereof. The present invention further relates to novel processes for preparing these compounds. The present invention also relates to novel, bleaching, oxidizing, disinfecting and/or detergent formulations containing magnesium di (dichloroisocyanurate) and hydrates thereof. The present invention has particular reference to novel products, processes and formulations disclosed in my application for Letters Patent filed in the United States Patent Office, September 14, 1959, Serial No. 839,549, now abandoned. The disclosure contained in the present application should be taken in conjunction with said application Serial No. 839,549, and considered as a continuation-in-part of said application.

It is one object of the present invention to provide novel compounds, namely anhydrous magnesium di (dichloroisocyanurate) and hydrates of magnesium di (dichloroisocyanurate) and to provide novel processes for preparing these compounds.

It is another object of this invention to provide novel compositions containing the aforementioned compounds, which compositions are useful for bleaching, oxidizing, disinfecting, sanitizing and other purposes and which are also highly stable toward loss of available chlorine.

Other objects and advantages of this invention will become apparent to those skilled in the art as the description of the invention proceeds.

Magnesium di (dichloroisocyanurate) and hydrates thereof, which salts can be represented structurally as

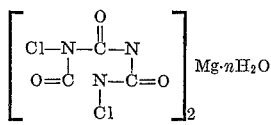

wherein "$n$" is an integer in the range of from 0 to 8 inclusive, are novel and useful sources of available chlorine in bleaching, oxidizing, disinfecting, sterilizing and/or detergent formulations. All of these salts are white solids having solubilities in the range of from 5.5% to 8.0% by weight depending upon the particular salt or hydrate.

It has presently been found that magnesium di (dichloroisocyanurate) octahydrate may be prepared by a process which comprises bringing together and reacting, in an aqueous medium, dichloroisocyanuric acid and a salt of magnesium and an acid having a dissociation or ionization constant below the dissociation constant of dichloroisocyanuric acid, and which last mentioned salt is incapable of undergoing an oxidation-reduction reaction with the dichloroisocyanuric acid. When dichloroisocyanuric acid is reacted with such a magnesium salt, particles of solid magnesium di (dichloroisocyanurate) octahydrate are unexpectedly formed in the aqueous medium and these particles can be readily separated from the bulk of such medium by filtration, centrifugation, and the like. Anhydrous magnesium di (dichloroisocyanurate) and the hexahydrate thereof may be prepared from the octahydrate by certain procedures hereinafter described.

The terms "dissociation constant" or "ionization constant" as used herein are synonymous and are intended to mean the ratio between (a) the concentration of dissociated hydrogen ions and acid radical anions of a weak acid and (b) the concentration of un-ionized molecules of that acid in a saturated aqueous solution of the acid at 25° C. The dissociation constant may be expressed by the following formula:

$$K_d = \frac{(cH^+)(cA^-)}{(cHA)}$$

where $K_d$, the dissociation constant, is the product of the concentration of ions ($cH^+$), and ($cA^-$), which are expressed as gram ionic weights per liter; divided by the concentration of un-ionized molecules ($cHA$), which is expressed as gram-moles per liter.

Examples of magnesium salts of acids having dissociation constants lower than the dissociation constant of dichloroisocyanuric acid and which do not undergo an oxidation-reduction reaction with dichloroisocyanuric acid, and which may be reacted with dichloroisocyanuric acid in accordance with the processes of the present invention, are magnesium carbonate, borate, propionate, succinate and stearate and the like. On the other hand, magnesium salts such as magnesium citrate, oxalate, oleate, and citrate, which have dissociation constants above that of dichloroisocyanuric acid, undergo oxidation-reduction reactions with dichloroisocyanuric acid and are therefore unsuitable for use in the processes of this invention.

It has been found generally desirable, in the preparation of the novel compounds of this invention, first to mix magnesium in the form of any of the first mentioned group of magnesium salts in an aqueous medium with dichloroisocyanuric acid in such proportions and at such rates as to form a reaction mixture having a pH below 8.0. The reaction mixture is preferably agitated such as by a mechanical agitating device, for example, an electric stirrer, and is, preferably maintained at a pH between 2.9 and 7.9, and a temperature in the range of from 5° C. to 35° C., preferably 15° C. to 25° C., during the period that the magnesium salt and dichloroisocyanuric acid are mixed together.

The magnesium salt, for example, the borate, propionate, succinate, or stearate salt, may be mixed with the dichloroisoyanuric acid in the aqueous medium in dry form or in the form of a dispersion consisting essentially of water and the magnesium salt in the form of an aqueous dispersion or slurry containing a stoichiometric amount of the magnesium salt in relation to the dichloroisocyanuric acid. The magnesium salt may be and preferably is added to a solution or slurry of dichloroisocyanuric acid in water. The rate of addition of such salt may vary to some extent but it is usually desirable to add the salt, either in the dry form or in the form of an aqueous dispersion or slurry at a rate sufficient to maintain the reaction zone slurry at a pH below 8, preferably below 7, and a pH in the range of from 2.7 to 6.0 is particularly preferred. Under such conditions the magnesium salt is usually added to the reaction zone over a period of from about 15 to about 45 minutes. If the pH of the reaction slurry is permitted to rise above a pH of 8, nitrogen trichloride is formed, usually in hazardous amounts. The nitrogen trichloride formed at a pH above 8 is an explosive compound and is produced by the decomposition of a portion of the triazine ring of dichloroisocyanuric acid and, in addition to the hazardous explosive conditions which are usually produced under such conditions, the yield of magnesium di (dichloroisocyanurate) octahydrate is considerably reduced.

During the addition of the magnesium salt to the reaction mixture it has been found especially desirable, as stated heretofore, to continually agitate the aqueous reaction mass or mixture, which usually is comprised of an aqueous slurry having a pH below 8 and containing dichloroisocyanuric acid, magnesium di (dichloroisocyanurate) octahydrate, the magnesium salt, and an acid corresponding to the acid radical of the magnesium salt. Since the dichloroisocyanuric acid and magnesium salt are usually present in the reaction zone as dispersed solids in the aqueous slurry, it is generally preferably to continue the aforementioned agitation for from about 45 minutes to about 90 minutes after the magnesium salt has been added to the reaction zone as above described. After sufficient agitation, substantially no un-reacted dichloroisocyanuric acid and/or magnesium salt remains in the aqueous slurry in the reaction zone which slurry then usually consists essentially of water, magnesium di (dichloroisocyanurate) octahydrate and an acid corresponding to the acid radical of the added magnesium salt. The solid octahydrate may then be separated from the bulk of the aqueous phase of the liquid in the reaction zone by procedures well known to those skilled in the art such as, for example, sedimentation, decantation, centrifugation, and the like.

Although any of the first mentioned group of magnesium salts may be reacted with dichloroisocyanuric acid, in an aqueous medium to form solid magnesium di (dichloroisocyanurate) octahydrate therein, magnesium carbonate is particularly advantageous because carbon dioxide is evolved during the reaction, and, if suitable proportions of magnesium carbonate and dichloroisocyanuric acid are used, the reaction medium, upon completion of the reaction, will usually consist substantially of water and magnesium di (dichloroisocyanurate), in the form of an aqueous slurry of the solid octahydrate. Where magnesium salts, such as for example magnesium borate, succinate, or propionate are used, the aqueous medium will contain the corresponding acid e.g. boric, succinic; or proprionic acid, in addition to magnesium di (dichloroisocyanurate) and such procedure usually results in additional washing and/or purification steps which are generally not required when magnesium carbonate is used.

In accordance with one embodiment of the present invention, magnesium di (chloroisocyanurate) octahydrate may be prepared by a process which comprises bringing together and reacting an aqueous slurry of about 2 molecular proportions of dichloroisocyanuric acid and an aqueous slurry of about 1 molecular proportion of magnesium carbonate in an aqueous medium having a pH below 8, preferably 2.7 to 7.9, and maintained at a temperature in the range of from about 15° C. to about 35° C. thereby forming magnesium di (dichloroisocyanurate) octahydrate, with the evolution of carbon dioxide, and thereafter separating said octahydrate from the bulk of the aqueous medium.

In a preferred embodiment of this invention, 2 to 3 parts by weight of a slurry consisting of water and magnesium carbonate in an amount such as to provide one molecular proportion of magnesium carbonate, are added to a reaction zone maintained at a temperature in the range of 15° C. to 35° C. and containing from 4 to 7 parts by weight of a slurry consisting of water and two molecular proportions of dichloroisocyanuric acid. The rate of such addition may vary considerably but should be such that the pH of the reaction zone slurry is maintained at a pH below 8 preferably a pH in the range of from 3.0 to 6.5. The magnesium carbonate is preferably added to the reaction zone over an extended period of time, preferably over a period of from about 15 to about 45 minutes, more preferably for about 30 minutes, to prevent or eliminate the bubbling over due to the effervescence of the reaction mixture in the reaction zone during the evolution of carbon dioxide and to maintain the pH conditions as above described. Since the dichloroisocyanuric acid and magnesium carbonate are present in the aqueous reaction mixture or slurry as dispersed solids, it is usually desirable to agitate the reaction mixture in the zone, preferably with a mechanical agitator such as for example, an electric stirrer, and to continue such agitation for from about 45 minutes to about 90 minutes after completing the addition of the aqueous slurry of magnesium carbonate to the reaction zone. Such agitation generally insures a complete reaction between the magnesium carbonate and dichloroisocyanuric acid and solid magnesium di (dichloroisocyanurate) octahydrate forms in the aqueous phase of the liquid in the reaction mixture, with evolution of carbon dioxide, usually in a yield of greater than 99.0% based on the reactants charged.

The solid octahydrate may be readily separated from the aqueous phase of the liquid in the reaction zone, which is maintained at a temperature in the range of between 15° C. and 35° C. and has a pH below pH 8, by procedures well-known to those skilled in the art such as decantation, filtration, precipitation and the like. It is preferred, however, to filter the magnesium di (dichloroisocyanurate) octahydrate to obtain a damp or moist solid for further processing as hereinafter described.

Magnesium di (dichloroisocyanurate) and at least two hydrates thereof, can be obtained in pure form in accordance with the processes of this invention, depending upon the procedure used in drying the damp magnesium di (dichloroisocyanurate) octahydrate. When such damp or moist octahydrate is dried at a temperature in the range of from about 20° C. to 90° C. in an atmosphere of air having a relative humidity of from about 70% to 100% a solid crystalline product, magnesium di (dichloroisocyanurate) octahydrate is formed which is free of water other than water of hydration. The product so obtained is characterized in having an available chlorine content of 50.5%, an $H_2O$ content, in the form of water of hydration, of 25.6% by weight, and is soluble in water to the extent of 8% by weight. Magnesium di (dichloroisocyanurate) octahydrate decomposes at temperatures above 155° C. and also exhibits, upon X-ray diffraction analysis, a distinct X-ray diffraction pattern having the following principal lines and relative intensities.

| Interplanar spacing (Angstroms): | Relative intensity, Percent |
|---|---|
| 13.381 | 45.0 |
| 6.702 | 40.0 |
| 5.824 | 40.0 |
| 5.273 | 58.0 |
| 4.525 | 84.0 |
| 4.458 | 40.0 |
| 3.450 | 31.0 |
| 3.386 | 95.0 |
| 3.195 | 23.0 |
| 3.140 | 100.0 |
| 2.590 | 63.0 |
| 2.479 | 44.0 |

When magnesium di (dichloroisocyanurate) octahydrate is dried in an atmosphere of air having a relative humidity of from about 20% to about 50% and at a temperature of from 30° C. to 50° C. a solid crystalline product, magnesium di (dichloroisocyanurate) hexahydrate, is formed which is free of water other than water hydration. This product has an available chlorine content of 53.8%, an $H_2O$ content, in the form of water of hydration, of 20.5% by weight and is soluble in water to the extent of 7.0% by weight. The hexahydrate decomposes at temperatures above 155° C. and exhibits, upon X-ray diffraction analysis, an X-ray diffraction pattern distinct from the X-ray diffraction pattern of the octahydrate and which has the following principal lines and relative intensities.

| Interplanar spacing (Angstroms): | Relative intensity, percent |
|---|---|
| 8.3387 | 20.5 |
| 5.7487 | 23.0 |
| 4.8701 | 7.5 |
| 3.9309 | 9.5 |
| 3.7904 | 8.0 |
| 3.3556 | 100.0 |
| 3.2464 | 30.0 |
| 3.1291 | 10.5 |
| 2.9810 | 10.0 |
| 2.8860 | 22.0 |
| 2.775 | 7.5 |
| 2.7566 | 7.5 |

When the above mentioned wet magnesium di (dichloroisocyanurate) octahydrate is dried in an atmosphere of air, having a relative humidity of from 50% to 70% and at a temperature in the range of from 20° C. to 50° C., a mixture of the octahydrate and the hexahydrate is generally obtained. The respective amounts of octahydrate and hexahydrate present in such mixture will depend on the relative humidity present in the atmosphere of air. Thus, for example, when wet magnesium di (dichloroisocyanurate) octahydrate is dried at the above mentioned temperatures in an atmosphere of air having a relative humidity of slightly more than 50% the resulting mixture will contain a preponderant amount of hexahydrate and a minor amount of octahydrate. The weight content of the mixture is reversed however, when the relative humidity is just under 70% during the drying procedure.

Time is not critical in any of the above drying procedures. For example, the octahydrate is not transformed to the hexahydrate no matter how long the drying procedure is performed as long as the relative humidity of the atmosphere of air remains in the range of from 70% to 100%.

It has been found that anhydrous magnesium di (dichloroisocyanurate) may be prepared by drying the two hydrates, e.g. magnesium di (dichloroisocyanurate) octahydrate or the hexahydrate and/or mixtures thereof, in an atmosphere of air wherein the air is free or substantially free of moisture (e.g. the atmosphere of air has a relative humidity of substantially zero percent) at a temperature of from 100° C. to 150° C. for periods ranging from 24 to 96 hours, depending upon the amount of material and the layer thickness of the octahydrate to be dried. The anhydrous magnesium di (dichloroisocyanurate) does not readily form unless the atmosphere is free or substantially free of moisture. However, when obtained after such drying procedure, it is a white amorphous solid which is surprisingly stable with respect to loss of available chlorine when incorporated in certain, hereinafter defined, formulations. This anhydrous compound generally has an available chlorine content of from 63.0% to 67.9% and is soluble in water to the extent of 5.5% by weight and decomposes at a temperature of 155° C. or higher. Unlike the hexahydrate and the octahydrate of magnesium di (dichloroisocyanurate) the anhydrous compound is unexpectedly amorphous and exhibits no X-ray diffraction pattern upon X-ray diffraction analysis.

A mixture of anhydrous amorphous magnesium di (dichloroisocyanurate) and the hexahydrate may be formed, for example, by exposing the anhydrous material in an atmosphere of air at a temperature of from 10° C. to 30° C. and having a relative humidity of from 20% to 50%.

Anhydrous magnesium di (dichloroisocyanurate) and the hydrates thereof have been found to be uniquely stable toward loss of available chlorine, in comparison with previously known dichloroisocyanurate salts, in the presence of a wide variety of hereinafter defined inorganic and/or organic compounds. Such compounds when mixed with the novel available chlorine-containing compounds of the present invention provide oxidizing, sterilizing, sanitizing and/or bleaching compositions which are unusually stable toward loss of available chlorine.

The compounds of the present invention are also unusually stable in the presence of neutral and alkaline inorganic compounds. Examples of such inorganic compounds are phosphates, such as di and trisodium orthophosphates, sodium acid pyrophosphate, tetrasodium pyrophosphate, sodium tripolyphosphate, sodium metaphosphates, such as trimetaphosphates, hexametaphosphates, Graham's salts, etc.; silicates such as the meta, ortho, di and tetra silicates; carbonates; aluminates; sulfates, chlorides, oxides, sulfides, etc. While the alkali and alkaline earth metal compounds, such as the sodium, potassium, lithium, calcium, barium, etc. analogues of the foregoing are the most commonly used compounds, it should be recognized that the polyvalent metal compounds, such as the aluminum, iron, titanium, etc. salts, oxides and the like can also be used in combination with the available chlorine compounds of this invention.

The inorganic compounds used in such combinations can be either water soluble or water insoluble depending upon the particular purpose for which the combination is to be used. For example, water soluble polyphosphates, including pyrophosphates are often used as sequestering agents in bleaching formulations; the polyphosphates, silicates, carbonates, and sulfates are often used as detergent builders, corrosion inhibitors, diluents and the like in organic detergent formulations. Insoluble compounds such as dicalcium orthophosphate, calcium carbonate, calcium sulfate, titanium dioxide, silica and the like, as well as naturally occurring materials such as talc and feldspar may be used as abrasive agents in scouring powders or other grinding or polishing formulations.

The inorganic compounds which are preferred for use in the compositions of this invention are alkaline or neutral inorganic metal salts either in the anhydrous or the hydrate form (except for trisodium phosphate hydrates), which are incapable of undergoing, to any appreciable extent, an oxidation-reduction reaction with the novel chlorine containing compounds of this invention. Among such salts are alkaline or neutral detergent builder salts such as alkali metal salts of the above described phosphates, carbonates, sulfates and chlorides, and the sodium and potassium salts thereof are particularly preferred. Among other preferred salts are fillers and abrasives, such as the alkaline earth metal salts of the aforedescribed phosphates, silicates and sulfates and the calcium salts thereof are particularly preferred.

The concentration of any of the magnesium di (dichloroisocyanurate) compounds and mixtures thereof which may be utilized in a particular formulation in combination with the aforementioned inorganic salts will depend largely on the specific use for which the formulation is designed and usually will be in the range of 0.1 to about 98% by weight of the formulation. For example, in strong sterilizing, oxidizing, disinfecting or bleaching compositions, the novel compounds of this invention may comprises a predominant proportion (e.g. up to 90% or 95% or more) of the formulation. In formulations designed for ultimate consumer use (for example, formulations such as laundry bleaches, scouring powders, and the like) considerably smaller proportions of the novel dichloroisocyanurate compounds of this invention may be used. For example, in a household laundry bleach between about 5% and about 20% by weight of the instant compounds will generally be suitable; with scouring powders from about 20% to as little as 0.05% is often sufficient; with dish washing compositions between about 1% and about 10% is satisfactory.

As previously pointed out, the novel dichloroisocyanurate compounds of the present invention are unique in their excellent stability with respect to available chlorine, in the presence of organic compounds. The resulting compositions may also, and preferably do, contain one or more of the above described inorganic compounds.

This property is useful in permitting the incorporation of the dichloroisocyanurate compounds of this invention in formulations containing organic perfumes or odor masking agents such as essential oils, organic sequestering or chelating agents such as the metal salts of ethylenediamine tetraacetic acid; organic dyes and coloring agents such as those described in Venkataruman, "Chemistry of Synthetic Dyes," Academic Press, Inc., New York, 1952; organic stain, corrosion or tarnish inhibitors such as those described in U.S. Patents 2,618,603 and 2,618,605; and surface active agents, such as foaming agents, detergents, emulsifiers and the like.

The term "surface active agents" as used herein is intended to include the anionic surfactants, such as the sulfated and the sulfonated alkyl, aryl, and alkyl aryl hydrocarbons disclosed in U.S. Patent 2,846,398, line 54 of column 3 to line 6 of column 5. Also included are non-ionic surfactants such as those set forth in column 5 of U.S. Patent 2,846,398, as well as well known cationic, anionic, and non-ionic surfactants described in Schwartz and Perry, "Surface Active Agents," Interscience Publishers, New York, 1949, and the "Journal of American Oil Chemists Society," the subject matter of all these publications being incorporated herein by reference.

The preferred organic compounds are those, which when incorporated with the novel dichloroisocyanurates of this invention, in formulations containing up to 50% or more by weight of the aforedescribed inorganic compounds or salts, do not undergo an oxidation-reduction reaction, to any appreciable extent, with the novel, stable dichloroisocyanurates or mixtures thereof.

Although the novel compositions of this invention are remarkably stable in comparison with previously known chlorine compositions containing high concentrations of available chlorine, there is still need for the exercise of some discretion in the formulation of the compounds of this invention in conjunction with organic materials. Thus, by way of example, when the above described inorganic salts are formulated with organic compounds it will generally be desirable to include in such formulations, a dominant proportion, that is, in excess of 50% by weight of the total formulation, or an alkaline or neutral inorganic compound or salt, hereinbefore described, to act as an inert diluent for the combination of organic compounds and the novel available chlorine containing compound and/or compounds of the present invention. In general, it is desirable to have in such compositions from about 50% to 99% of inert organic compound diluent, from about 0.05% to about 25% of the above described organic material and from about 0.05% up to about 50% of the magnesium di (dichloroisocyanurate) compounds, singly or in combination, of this invention. For most purposes, however, preferred formulations should contain from 89% to 92% of the inert inorganic compounds or diluent, from about 0.05% to 5.0% organic material and from 0.05% to 10% of the novel available chlorine containing compounds of this invention.

A further understanding of the products, compositions and processes of the present invention will be obtained from the following specific examples which are intended to illustrate this invention but not to limit the scope thereof; parts and percentages being by weight unless otherwise specified.

*Example I*

To a suitable reaction vessel, equipped with a thermometer and agitator was added 396 grams of dry dichloroisocyanuric acid and 2000 grams of water and the charge mixed. To the agitated slurry over a period of about ½ hour was added a mixture of 85 grams of magnesium carbonate and 150 grams of water, in the form of a slurry, while maintaining the temperature at about 20° C. During the addition of magnesium carbonate effervescence was observed which was due to the evolution of carbon dioxide. Upon completion of the magnesium carbonate addition, the reaction mass was agitated for about one hour and thereafter filtered. (The pH of the filtrate was 6.0.) The filter cake was air dried at room temperature (30° C.) for several hours (at an ambient relative humidity of 40%). The dried product was a white crystalline solid containing 20 percent by weight of water of hydration and identified as the hexahydrate of magnesium di (dichloroisocyanurate). This hexahydrate was soluble to the extent of 7.0 grams per 100 grams of water at 25° C. and was characterized by an available chlorine content of 53.5% or 99.4% of theory.

The hexahydrate of magnesium di (dichloroisocyanurate) of Example I on drying in an air circulating oven at 150° C. for two days yielded anhydrous white solid magnesium di (dichloroisocyanurate). This anhydrous product was an amorphous compound which had no X-ray diffraction pattern.

*Example II*

A sample of the magnesium di (dichloroisocyanurate) hexahydrate obtained in Example I was further dried in an air circulating oven at a temperature of 150° C., wherein the circulating air had a relative humidity below 20%, for two days.

At the end of this period, white, amorphous anhydrous magnesium di (dichloroisocyanurate) was obtained. This anhydrous product has an available chlorine content of 67.2%, was soluble in water to the extent of 5.5%, and exhibited no X-ray diffraction pattern.

*Example III*

The procedure of Example I was repeated except that the filter cake was dried at 37.5° C. in a humidified oven wherein the relative humidity was maintained at about 85% for a period of 4 days. The dried product obtained was a white crystalline solid having an available chlorine content of 50.5%, a moisture content, in the form of water of hydration of 25.6% and was soluble in water to the extent of 8%. The resulting product was magnesium di (dichloroisocyanurate) octahydrate and exhibited the X-ray diffraction pattern herein before described for that compound.

*Example IV*

The procedure of Example III was repeated except that the moist, damp filter cake containing dichloroisocyanuric acid was dried at 37.5° C., in an oven wherein the relative humidity was maintained at about 62%. The dried product was a white crystalline solid having an available chlorine content of 52.1% and 22.2% of moisture in the form of water of crystallization. The product constituted a mixture of magnesium di (dichloroisocyanurate) hexahydrate and magnesium di (dichloroisocyanurate) octahydrate. The X-ray diffraction pattern of this material exhibited diffraction lines common to both of the aforementioned hydrates.

*Example V*

As illustrative of the stability of the compounds of this invention as compared to sodium dichloroisocyanurate, 1.8 grams of magnesium di (dichloroisocyanurate) hexahydrate and 1.8 grams of anhydrous sodium dichloroisocyanurate, respectively in powdered (−140, +200 mesh) crystalline form were mechanically mixed with 90 grams of a mixture consisting of 5 grams anhydrous sodium metasilicate, 5 grams of sodium dodecyl benzene sulfonate, 60 grams of anyhydrous sodium sulfate and 30 grams of anhydrous sodium tripolyphosphate. The respective compositions were then placed in open wide-mouthed bottles and put in a humidity cabinet and exposed to a temperature of 58° C. at 45% relative humidity for 30 days. Upon removal of the respective mixture the percentage weight loss of available chlorine was found to be as follows.

| Composition containing: | Available chlorine loss, percent |
|---|---|
| Sodium dichloroisocyanurate | 56 |
| Magnesium di (dichloroisocyanurate) | 40 |

*Example VI*

A composition was prepared which consisted of a mixture of 2% anhydrous magnesium di (dichloroisocyanurate) and 98% of a material containing 83 parts silicia, 8 parts sodium tripolyphosphate, 6 parts anhydrous trisodium phosphate and three parts of sodium dodecyl benzene sulfonate. A second composition was prepared as above described except that 2% anhydrous dichloroisocyanuric acid was substituted for the anhydrous magnesium di (dichloroisocyanurate). Still a third composition was prepared as above wherein anhydrous sodium dichloroisocyanurate was substituted for anhydrous magnesium di (dichloroisocyanurate).

The three compositions were placed in open jars and maintained at a temperature of 90° F. and a relative humidity of 85%. The available chlorine content of the three compositions was analytically determined after 233 hours and 283 hours. The stability of anhydrous magnesium di (dichloroisocyanurate) compositions, with respect to available chlorine, is compared with compositions containing the other dichloroisocyanurates immediately below.

| | Loss of available chlorine, percent | |
|---|---|---|
| | After 233 hours | After 283 hours |
| Composition containing: | | |
| Dichloroisocyanuric acid | 26.0 | 30.0 |
| Sodium dichloroisocyanurate | 25.0 | 27.0 |
| Magnesium di (dichloroisocyanurate) anhydrous | 14.0 | 15.0 |

*Example VII*

A composition was prepared which consisted of an admixture of 4% anhydrous magnesium di (dichloroisocyanurate) and 96% of a material composed of 15 parts potassium chloride, 15 parts sodium sulfate, 15 parts sodium carbonate, 15 parts sodium metasilicate, 37.5 parts sodium tripolyphosphate and 2.5 parts of the condensation product of tridecyl alcohol made by the "oxo" process and about 9 molar proportions of ethylene oxide. A second composition was prepared as above described except that 4% anhydrous dichloroisocyanuric acid was substituted in place of the anhydrous magnesium di (dichloroisocyanurate). Still a third compostion was prepared as above, except that 4% anhydrous sodium dichloroisocyanurate was substituted for magnesium di (dichloroisocyanurate). These three compositions were placed in wide mouth open jars and maintained at a temperature of 90° F. and a relative humidity of 85%. The excellent stability of the composition containing anhydrous magnesium di (dichloroisocyanurate) with respect to available chlorine is shown in comparison with the compositions containing the other dichloroisocyanurates in the following table.

| | Loss of available chlorine, percent | |
|---|---|---|
| | After 233 hours | After 283 hours |
| Composition containing: | | |
| Dichloroisocyanuric acid | 70.0 | 76.0 |
| Sodium dichloroisocyanurate | 63.0 | 72.0 |
| Magnesium di (dichloroisocyanurate) anhydrous | 32.0 | 33.0 |

What is claimed is:
1. A compound selected from the group consisting of anhydrous, amorphous magnesium di (dichloroisocyanurate) and crystalline hydrates thereof.
2. Anhydrous, amorphous magnesium di (dichloroisocyanurate).
3. Crystalline magnesium di (dichloroisocyanurate) hexahydrate.
4. Crystalline magnesium di (dichloroisocyanurate) octahydrate.

References Cited by the Examiner

UNITED STATES PATENTS

| | | | |
|---|---|---|---|
| 2,171,901 | 9/1939 | Wilson | 260—248 |
| 2,607,739 | 8/1952 | Hardy | 260—248 |
| 2,913,460 | 11/1959 | Brown et al. | 260—248 |
| 3,035,054 | 5/1962 | Symes et al. | 260—248 |
| 3,035,056 | 5/1962 | Symes et al. | 260—248 |

FOREIGN PATENTS 1,149,758 7/1957 France.

OTHER REFERENCES

Claus et al.: J. fur Prakt. Chemie, vol. NF 38, pages 217 to 225 (1888).

Hantzsch: Ber. Deut. Chem., vol. 39, pages 139 to 149 (1906).

Kendall et al.: "General Chemistry," Revised edition, pages 584 to 585, D. Appelton-Century Company (1936).

WALTER A. MODANCE, *Primary Examiner.*

IRVING MARCUS, NICHOLAS S. RIZZO, *Examiners.*